March 20, 1973   G. F. DRAKE   3,721,596
FLUID SEPARATION AND METHOD AND APPARATUS FOR FORMING SAME
Filed Nov. 24, 1969   2 Sheets-Sheet 1

INVENTOR
Gene F. Drake

INVENTOR.
GENE F. DRAKE

United States Patent Office 3,721,596
Patented Mar. 20, 1973

3,721,596
FLUID SEPARATION AND METHOD AND APPARATUS FOR FORMING SAME
Gene F. Drake, 1325-C 37th St. NE., Canton, Ohio 44714
Continuation-in-part of application Ser. No. 693,665, Dec. 26, 1967. This application Nov. 24, 1969, Ser. No. 879,132
Int. Cl. B05c 3/12; B01d 13/04, 39/06
U.S. Cl. 156—181      2 Claims

ABSTRACT OF THE DISCLOSURE

A method of forming a thin membrane is disclosed which has a substantially uniform thickness and is particularly useful for osmotic desalinization. An apertured film support member or assembly is immersed in a liquid casting solution and withdrawn therefrom so that a part of the liquid casting solution forms a homogeneous bridging film across the apertures provided by the film support member such that the thickness of the film is primarily determined by the fluid characteristics of the casting solution. The withdrawn portion of the film support member and the bridging film are suspended until the film sets to form a membrane which is substantially stable in nature.

---

This is a continuation-in-part of my copending application Ser. No. 693,665, filed Dec. 26, 1967, now abandoned.

BACKGROUND OF THE INVENTION

This invention relates generally to a method of forming thin membranes and, more particularly, to a method of forming fluid separation membranes useful in osmotic desalinization or dialysis processes. The type of thin membranes with which this invention is primarily concerned are sometimes referred to as "semipermeable" and are described as being "microporous" or "porous." However, these terms are generally used herein to refer to the membrane's structural characteristic which allows an appreciable rate of solvent flow with a minimum of transfer of the material to be separated therefrom under appropriate conditions. In the case of desalinization of saline water, there would be an appreciable flow of fresh water and a minimum solute or salt transfer across the membrane. In this manner potable water may be produced from the saline water.

Although the method of this invention is particularly suitable for forming osmotic desalinization membranes, it should not be limited thereto as it may be used to form membranes suitable for other solvent-solute separations or colloidal solution separations. However, the invention will be described with particular reference to reverse osmosis desalinization processes.

PRIOR ART

A cursory explanation of the reverse osmosis process might be beneficial at this time. Initially, it may be noted that osmosis refers to the spontaneous flow of solvent through a membrane from a dilute solution to a more concentrated solution. Osmosis refers to the flow of solvent only. If solute movement in the opposite direction occurs, this is referred to as "diffusion." A membrane which permits the flow of solvent but not the solute is perfectly semipermeable. However, there is usually some degree of solute flow and the membranes are referred to as "semipermeable." Since there is a preferential direction of solvent flow, a pressure differential will exist between the two solutions. The osmotic pressure is the excess pressure which must be applied to a solution to prevent the passage into it of solvent when the two liquids are separated by a perfectly semipermeable membrane. When this pressure is obtained, equilibrium exists. However, if the pressure on the more concentrated solution is increased beyond the osmotic pressure value, solvent flow from the more concentrated solution to the more dilute solution will occur. This is reverse osmosis. Thus, the reverse osmosis process may be employed to purify or desalinate saline water solutions so as to obtain potable water.

One of the greatest problems in the reverse osmosis process is the slow rate of liquid transfer through the membrane. However, desalinization by the reverse osmosis technique has tended to become a competitive process, in some applications, with the development of suitable membrane compositions having increased flow rate. For example, Loeb et al., U.S. Pat. No. 3,133,132 discloses a number of membrane casting solution compositions and membrane curing procedures as well as a membrane casting procedure. As there disclosed, the liquid casting polymer is cast on a glass plate using a doctor blade or knife. This technique has certain deficiencies as noted below. A doctor blade or knife coating technique is subject to variations in the thickness of the casting. For example, any variation in the relative speed of the doctor blade and casting platform will result in thickness variations of the casting. Similar variations in the thickness of a casting will occur if an extremely uniform and even casting platform is not provided. In addition, since a coating platform is required, there exists the possibility of contamination of the coating surface. The technique is also subject to the problems of entrapping air bubbles either at the doctor blade and coating platform interface or within the casting solution itself. If air is trapped in either of these ways, a void will exist in the subsequently cured membrane, making it unusable, or the membrane may contain a localized thin spot which may also affect the usability of the membrane.

The cross sectional structure of a membrane produced by the above procedure may be described as being comprised of a relatively porous structure between two exterior skins. The intermediate porous layer is believed to have no purpose in the desalinization process. The thin skin formed on the surface away from the glass or casting platform is believed to comprise only nine percent of the membrane thickness and is believed to perform substantially all of the functions of desalinization. The opposite surface of the membrane or the surface adjacent to the glass is also comprised of a thin skin, but it is not believed to take any part in the desalinization process. The effective skin will be referred to as "osmotic," while the useless skin will be called "passive."

As noted by Loeb et al., supra, the membranes produced by their method are functional in one direction only in that the "osmotic" skin must be adjacent to the more concentrated saline solution. If the "passive" skin is placed against the more concentrated saline solution, the membrane is not effective for desalinization purposes.

Although the osmotic pressure of sea water is about 350 p.s.i., it has been found necessary to employ pressures as high as 1500 to 2000 p.s.i. in the reverse osmosis desalinization process. Consequently, the membranes are subject to compaction, and may be permanently set or strained so as to result in a substantial reduction in thickness. Loeb et al. indicates that such reduction may be as high as 35 to 40 percent. This compaction which occurs primarily in the intermediate porous layer is also believed to be a contributing cause of low liquid transfer rates.

Another method of forming membranes is disclosed by Duclaux in U.S. Patent Numbers 1,693,890 and 1,720,670 and by Cotton, Number 2,944,017. These patents describe the use of a woven cloth impregnated with a membrane casting olsution so as to fill the open weave areas. Such membranes are subject to certain deficiencies.

In particular, there will be substantial membrane thickness variations in the relatively small weave open spaces which are bridged by the membrane. Since these spaces are small, the amount of casting solution retained therein as the cloth is withdrawn from the solution will be primarily a function of the adhesion of the casting solution with respect to the cloth. The slightest variation in the relative size of the opening will result in a substantial variation in membrane thickness. In addition, since the relative adhesion will primarily govern the membrane thickness, the resulting membrane will be substantially equal in thickness to the thickness of the cloth. This is because the portion of the casting solution adjacent to the supporting cloth will have a thickness substantially equal to the thickness of the yarns forming the cloth and twice that thickness at yarn crossover points in the cloth weave. Since the weave openings are relatively small, it is apparent that a substantial portion of the cloth must be included in a reasonably sized membrane. Consequently a substantial portion of the membrane structure would be inhibited or blocked by the yarns forming the cloth.

Further, the cloth dipping method is difficult to utilize with reliability since air bubbles tend to occur, particularly in the areas of crossover between two pieces of yarn, and such air bubbles cause objectionable voids or pockets in the final membrane. In some instances, such air bubbles may result in an opening through the membrane which would render it useless.

A method of forming extremely thin complex films is disclosed by Michaels in U.S. Patent Number 3,276,598. In the Michaels method the complex films are formed at the interfaces of two solutions of oppositely charged polyelectrolytes due to ionic interaction between the solutions. Consequently, the films completely block further interaction between the polymers and their thickness is self-limiting. Therefore, although this method may satisfactorily produce uniformly thin membranes where a two-component solution system is employed, it does not provide a method applicable to the problems encountered in a single component casting solution as noted above.

SUMMARY OF THE INVENTION

This invention provides a novel and improved membrane and a method of forming such membrane which are particularly useful in reverse osmosis desalinziation. Briefly stated, the method includes the immersion of an apertured film support member or assembly in a liquid casting solution. The film support is withdrawn from the casting solution so that a part of the casting solution forms a homogeneous bridging film across the provided apertures. The support and the casting solution are arranged so that the film thickness is determined primarily by the fluid characteristics of the casting solution independent of the film support except at the peripheral location of film support. Once free of the solution, the bridging film should be suspended so as to allow it to form a stable film configuration.

The withdrawn portion of the film support and the homogeneous bridging film may then be provided with any subsequent curing treatments. These treatments may include exposure to a controlled humidity atmosphere and/or immersion in various aqueous wash baths. When a humidity exposure treatment is employed, the bridging film will essentially assume its final shape during or before this process. It is believed that the humidity of the atmosphere will tend to extract the solvent from the bridging film so as to form a thin skin on each surface of the film. This is believed true, since the solvents generally employed in the casting solution are miscible in water. Consequently, the subsequent aqueous baths perform a similar function until the membrane is finally completely formed. The aqueous wash baths may also be at elevated temperatures to provide a heat treatment for the membranes. These final processes determine the purification and transfer characteristics of the membrane.

The significance of the elevated wash bath temperature should be well known to anyone versed in the art. To give a brief summary of the effect of heat treatment, a higher temperature tends to provide better desalinization, but tends to decrease the liquid transfer rate. For dialysis membranes usually such post casting treatment is either eliminated or is modified appreciably.

In comparison to the casting on glass method described above, the method of the present invention has many significant advantages. Initially, it may be noted that membrane thickness variations are substantially eliminated. Since the film thickness and subsequently the membrane thickness are primarily governed by the fluid characteristics of the casting solution, the surface tension will cause flow until the thickness is substantially uniform over substantially the entire area of the membrane. Thus, control of fluid characteristics, and in particular, the solution viscosity, is substantially all of the control required to assure a uniform thickness. There will be an increase in film thickness near the periphery of the film adjacent to the film support member. However, the support member is arranged so that this area of increased thickness comprises a relatively small percentage of the entire film surface area. The natural tendency of the casting solution, which forms the bridging film to flow toward the supporting peripheries immediately after withdrawal from the liquid casting solution source will also tend to carry any impurities in the atmosphere which contact the suspended film toward the periphery. Therefore, the impurities will be localized at the peripheries instead of becoming a part of the membrane product.

A membrane produced by the method of this invention will have a symmetrical cross section structure. Since both surfaces of the film are exposed to the atmosphere, each will be an "osmotic" skin and the membrane is functional in both directions.

The method of the present invention also tends to eliminate the entrapment of air bubbles in the membrane, as compared to the coating on the glass plate or coating platform technique. In addition, the relatively low viscosity of the casting solution used in the method of this invention will not tend to retain air bubbles as compared to the casting solutions used formerly.

The method of the present invention provides thinner films which have a more uniform thickness than those provided by the impregnated cloth method. This is true since thickness of the films produced by the present method is primarily governed by the casting solution characteristics, and not by the thickness of the film supporting member. A thin membrane is desirable since one of the causes of low liquid transfer rates is believed to be excessively thick membranes. In addition, since only the relatively small openings in the weave of the impregnated cloth comprises the membrane forming areas, a substantial portion of the entire area of a membrane formed by this method is useless as it is blocked by the yarns of the cloth. Such substantial blockage does not exist in the membranes formed by the method of the present invention. Further, in accordance with the present invention there is substantially no tendency for air bubbles to be formed in the membrane so the present method eliminates such problem existing when cloth is impregnated to form the membrane. These and other features and advantages of the invention will become apparent and more fully understood from the following detailed description of the invention and from the accompanying drawings.

DETAILED DESCRIPTION OF THE DRAWINGS

Figure 1:
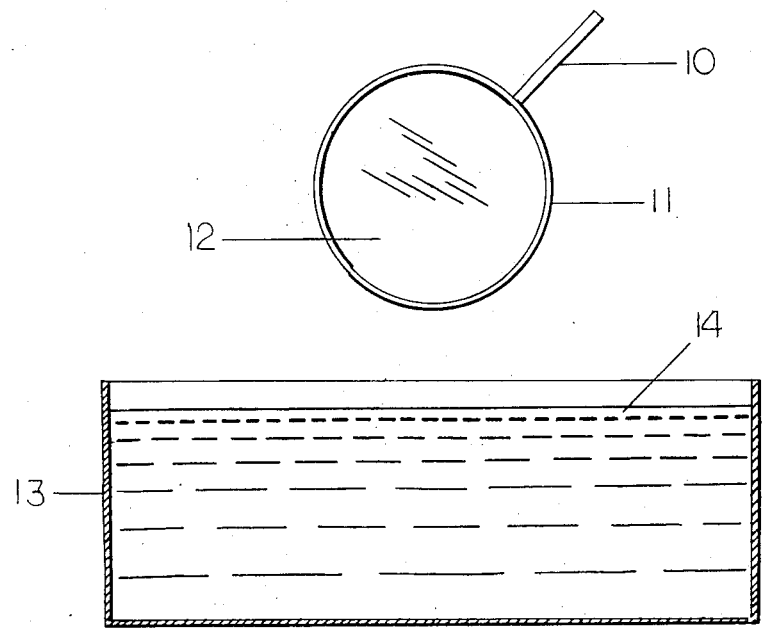
FIG. 1 is a side view of an apparatus for casting the membrane. A container for holding the casting solution is also shown in section for ease of illustration.

My method, partially drawn in FIG. 1, is accomplished as follows. A network as used herein is an open hoop 11 or a series of such openings. A handle 10 is connected to the open hoop or network 11 for convenience in lowering the network into the solution. The handle is, of course, not vital to the process. In my experiments, I have found a network opening width of approximately one to three inches easy to work with. The casting solution 14, which will be described in detail later, is held in an open container 13. The network 11 is first immersed in the casting solution 14 so as to completely submerge the open hoop 11. The network is then withdrawn approximately vertically from the casting solution so that a part of the liquid casting solution forms a single homogeneous bridging film 12 which is unsupported except at its periphery by the hoop 11. The network 11 and the bridging film 12 are then suspended in the atmosphere to give the product time to conform to its final shape. The length of time of this suspension in the atmosphere may determine some of the product's liquid flow rate and purification characteristics. As indicated earlier, the suspension period may be followed by or include a controlled humidity treatment.

The casting procedure just described is followed by "curing," which gives the product its characteristics of liquid transfer rate and purification. By varying the curing procedure one may give the product a greater ability to reject salts which pass through during osmosis or increase the rate at which water passes through during osmosis. In curing, the membrane is usually immersed in an ice water bath for about an hour.

The product 12 may or may not then be immersed in a hot water bath, depending on the type of casting solution used. For example, an acetic acid formula does not require this step. The temperature of this bath may range from about 40° C. to about 98° C. and the time of immersion may range from about 30 seconds to about an hour. The higher the temperature and the longer the bath, the greater are the purification characteristics of the product. However, the higher temperature and the longer bath retard the rate of liquid transfer. A happy medium must be met in order for the manufacturer to attain his required amount of product and at the same time purify it to his satisfaction.

Figure 2:
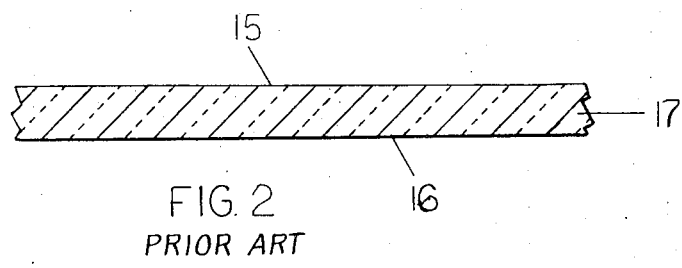
FIG. 2 shows a cross sectional view of a membrane produced by the prior art. One surface of the membrane is osmotic, while the other surface is passive and not useful.
Figure 3:
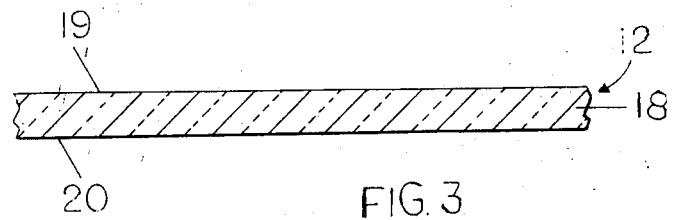
FIG. 3 shows a membrane produced by the apparatus shown in FIG. 1. Both surfaces of the membrane are osmotic and useful.

The product of the prior art as shown in FIG. 2 differs from the product of my method as shown in FIG. 3 in several respects. As shown in FIG. 2, the cross section of a membrane formed by the method of casting on a glass plate is comprised of an osmotic skin 15, a porous center portion 17, and a passive skin 16. As indicated previously, the porous center portion 17 and the passive skin 16 are not believed to take any part in the purification or desalinization process. A cross section of a membrane formed by my method is illustrated in FIG. 3. This membrane also has two surface skins 19 and 20 and an intermediate, porous portion 18. However, both surface skins 19 and 20 are osmotic in this instance. It may also be noted that there is less of the useless center material 18, making the product membrane appreciably thinner. The product will range from approximately 0.003 inch in thickness to 0.0001 inch. The prior membranes average about 0.005 inch in thickness. As indicated by my experiments, a thinner membrane is desirable as it will tend to have higher rates of liquid transfer. Since both sides of my membrane are exposed to the atmosphere during casting, and two osmotic surface skins are formed, either side of the membrane may face the substance to be purified. With the prior art membranes formed by casting over glass, only the side 15 exposed to the air during casting is suitable for purification. The side 16 adjacent the glass plate or coating platform during casting is useless.

The casting solution as defined herein is the basic material from which the membrane is formed. Many forms of the casting solution may be used with this process. To give an example of those possible, I will list those used in my experimentation. The casting solution used consisted of cellulose acetate and a solvent. Depending upon the solvent used, other additives may increase the rate of transfer or purification properties. To my knowledge, there is no way to classify these last additives, except that they increase the transfer rates of the membranes.

The following casting solution formula produced a thin membrane:

| | Percent |
|---|---|
| Cellulose acetate | 22 |
| Acetone | 67 |
| Water | 10 |
| $Mg(ClO_4)_2$ | 1 |

The following casting solution produced a membrane which was less susceptible to drying before the cold water bath:

| | Percent |
|---|---|
| Cellulose acetate | 25 |
| Acetone | 45 |
| Formamide | 30 |

Formic acid and methyl formate have been used to replace acetone. Also, the magnesium perchlorate of the first-listed formula for casting solution has been found replaceable by $NaClO_4$, $Al(ClO_4)_3$, KNCS, $HClO_4$, $HNO_3$, and numerous other additives with various degrees of success.

Variations in the curing process are possible by employing a casting solution utilizing glacial acetic acid. No heat treatment is necessary with this casting solution, yet my method of casting may be used. The following is an example of a casting solution using acetic acid:

| | Percent |
|---|---|
| Cellulose acetate | 30 |
| Glacial acetic acid | 60 |
| Water | 10 |

As can be seen from this description of the casting solution, many formulas are possible in addition to those listed. The great variety of possibilities makes it difficult to find a chemical classification which is common to all of the formulas.

Figure 4:
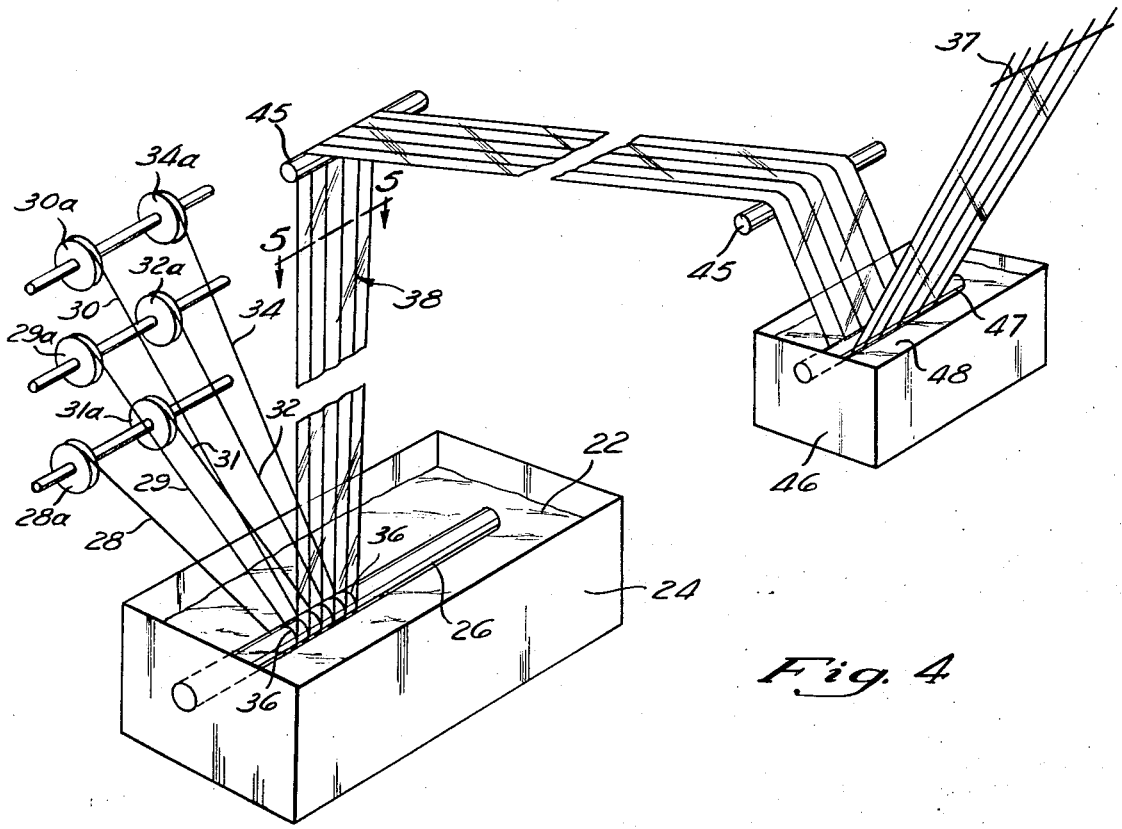
FIG. 4 shows a perspective view, partially in section, of another form of apparatus useful in forming membranes by the method of this invention.
Figure 5:
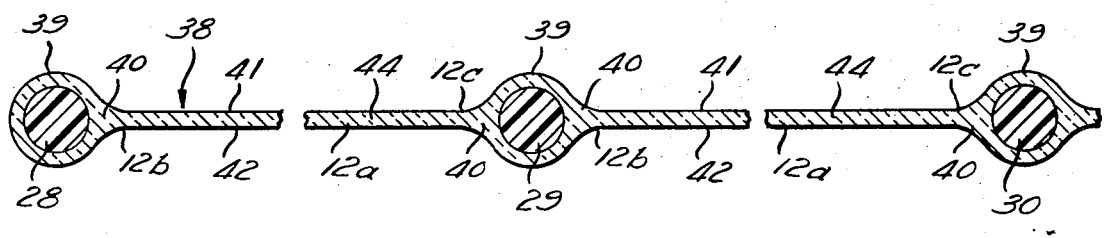
FIG. 5 is a partial cross sectional view of a membrane formed by the apparatus shown in FIG. 4, the plane of the section being indicated by the line 5—5 in FIG. 4.

FIGS. 4 and 5 disclose a second embodiment of an apparatus for forming membranes in accordance with this invention. This apparatus permits the manufacture of membranes of substantially any desired length and width by substantially continuous processing.

Referring to FIG. 4, the casting solution 22 is held in a container 24. The container 24 also provides a submerged roller 26 which guides the support filaments 28, 29, 30, 31, 32, and 34, which comprise the filament assembly. Thus, the film support member in this embodiment is a filament assembly as opposed to an open hoop or network and the apertures are very long in comparison to their width. The support filaments may be formed from any suitable material, such as nylon for example. Thus, the support filaments may be supplied from spools or rolls, such as 28a, 29a, 30a, 31a, 32a, and 34a. The support filaments may enter the casting solution 22 at any convenient angle, since they will be appropriately aligned by the roller 26. For example, the roller 26 may provide a series of appropriately laterally spaced circular channels or recesses 36 about its periphery, which will guide the support filaments, each filament being associated with a single roller channel or recess. In this manner, the support filaments will be arranged in a substantially parallel fashion at appropriately spaced lateral intervals as they pass around the roller 26, the direction of travel in FIG. 4 being from left to right. Initially, a transverse support filament 37 laterally connects each of the longitudinal support filaments 28, 29, 30, 31, 32, and 34 to initiate the formation of a homogeneous bridging film.

As the support filaments pass around the roller 26 and emerge from the casting solution 22, a portion of the casting solution substantially completely surrounds each of the support filaments and forms a homogeneous bridging film 12a between them so as to form membrane film assembly 38. The membrane film assembly 38 is withdrawn from the casting solution 22 in a plane which is substantially perpendicular to the plane of the surface of the casting solution.

The membrane film assembly 38 will have a cross sectional structure as illustrated in FIG. 5. It should be noted that FIG. 5 is only a partial section and illustrates only the filaments 28, 29, and 30. However, a similar structure extends to the remaining filaments 31, 32, and 34. The support filaments 28, 29, 30, 31, 32, and 34, which form the filament assembly or film support, are each completely surrounded with casting solution at 39, and are connected by homogeneous bridging films 12a. Each bridging film will have an increased thickness at 40 near its associated supporting filaments. However, a substantial portion of the film between 12b and 12c has a thickness determined substantially entirely by the fluid characteristics of the casting solution. In a manner similar to those described above, the membrane film assembly 38, upon emerging from the casting solution 22, should be suspended in the atmosphere to give the product time to conform to its final shape, as shown in FIG. 5. Similar to the membrane product described in the first embodiment of my invention, this membrane will also have two osmotic skins 41 and 42, and an intermediate porous layer 44. Because there are no closely spaced cross supports the flow of the casting solution adjacent to the casting solution surface is not interrupted and the film is uniform in thickness throughout its length.

The membrane film assembly 38 may be cured in a fashion similar to that described in the first embodiment. This may include humidity treatments, ice water bath washes, and hot water bath washes.

Once the film membrane assembly 38 has been suspended so as to become stable in nature, it is guided by appropriate rollers 45 through the subsequent curing steps. In FIG. 4, a single bath is shown. This would be appropriate for an acetic acid formula casting solution, as it merely requires an ice water bath. Therefore, the ice water bath container 46 supports the roller 47, which guides the membrane film assembly 38 through the bath of water 48.

With a method of forming membranes in accordance with the present invention, it is possible to produce membranes having a substantial area over which the membrane is very uniform in thickness and is substantially free of obstructions. Further, the membrane has two active sides so that it can be used in either direction.

When the embodiment of FIGS. 4 and 5 is utilized, membranes can be formed of substantially any width and length. The spacing of the filaments must be sufficiently small so that a quality film will be formed between the filaments. However, if greater width is required for the finished membrane, it is merely necessary to form a support assembly which includes more filaments. In this manner, the membrane may be made with substantially any width. Similarly, the process of forming is substantially continuous so the membrane can be formed of substantially any length, the only limitation being the length of the filaments in the supporting assembly. With this method of manufacture, the adjacent filaments in effect define elongated openings or apertures of any desired length.

In FIG. 4, only one transverse support filament 37 is illustrated and only one such filament is required in most instances. However, if desired, transverse elements may be spaced along the network at intervals to reestablish the film in the event that it breaks for any reason. However, in such an event, the spacing should be substantial so that such transverse elements do not interrupt the film during its formation excepting at relatively widely spaced locations. A very uniform film structure is obtained since the film is uninterrupted by transverse elements and the liquid is free for uninterrupted flow back to the surface of the casting solution. With such a method, steady conditions are established and the membrane is very uniform in character.

The apparatus in accordance with FIG. 4 has additional advantages. During the curing of the film, any shrinkage which tends to occur can cause the filaments to move laterally toward each other without causing damaging stresses in the film. In fact, such lateral movement can occur to provide substantially complete relief of lateral stresses.

When the casting solution is of the type which results in substantial shrinkage during a curing operation, it is desirable to form the filaments of a material having sufficient elasticity so that the tension loading applied to the filaments produces axial stretching of the filaments in an amount equal to the lengthwise shrinkage occurring during the curing operation. When this is done, the apparatus is arranged so that tension in the lengthwise filaments is relieved during the curing operation at a rate equal to the rate of shrinkage and the resulting membrane is not subjected to axial stress resulting from such shrinkage. Consequently, in such a structure and method, the resulting membrane is completely relieved of shrink induced stresses in both the longitudinal and lateral direction. The drives for moving the support assembly are not illustrated but suitable rolls may be provided with drive means for this purpose. Further, rolls may be provided with drag devices to cooperate with the power drive and provide the desired tension.

Although preferred embodiments of this invention are described, it should be understood that various modifications and rearrangements of parts may be resorted to without departing from the scope of the invention.

What is claimed is:

1. A method of forming a fluid separation membrane having at least a portion which is unsupported excepting at its periphery and which portion is substantially uniform in thickness over a substantial part of its area comprising immersing in a single substantially homogeneous liquid casting solution a support means having at least one opening with an area which is at least equal in area to the desired area of said portion, withdrawing said support means from said solution so that a part of said liquid casting solution forms a single homogeneous bridging film across said opening which is unsupported excepting at its periphery and has a thickness determined substantially entirely by the fluid characteristics of said casting solution, and thereafter suspending the withdrawn portion of the support means and said bridging film until the film sets to form a membrane which is substantially stable in nature and has characteristics of fluid transfer and purification, said support means being a filament assembly having at least three laterally spaced long support filaments which are withdrawn from said casting solution in a substantially parallel relationship and substantially perpendicular to the surface thereof causing a portion of said casting solution to substantially completely surround said support filaments and forming a homogeneous bridging film between adjacent support filaments, said support filaments being each laterally spaced a distance less than one inch and at a distance such that said bridging film is substantially coplanar with its associated supporting filaments, said adjacent filaments cooperating to define an elongated uninterrupted opening having a length greatly exceeding its width, the parallel filaments of said filament assembly being elastically stretched during their removal from the casting solution an amount substantially equal to the longitudinal shrinkage of the film during curing thereof so that release of such tension results in a membrane substantially free of shrinkage induced stresses.

2. A method of forming a fluid separation membrane having at least a portion which is unsupported excepting at its periphery and which portion is substantially uniform in thickness over a substantial part of its area comprising immersing in a single substantially homogeneous liquid casting solution a support means having at least one opening with an area which is at least equal in area to the desired area of said portion, withdrawing said support means from said solution so that a part of said liquid casting solution forms a single homogeneous bridging film across said opening which is unsupported excepting at its periphery and has a thickness determined substantially entirely by the fluid characteristics of said casting solution, and thereafter suspending the withdrawn portion of the support means and said bridging film until the film sets to form a membrane which is substantially stable in nature and has characteristics of fluid transfer and purification, said support means including a filament assembly having at least two laterally spaced long support filaments which are withdrawn from said casting solution causing a portion of the casting solution to substantially completely surround said support filaments and forming a single homogeneous bridging film between said support filaments, said support filaments being elastically stretched during their removal from the casting solution an amount substantially equal to the longitudinal shrinkage of the film during the curing thereof so that release of such tension results in a membrane substantially free of shrinkage induced stresses.

References Cited

UNITED STATES PATENTS

| | | | |
|---|---|---|---|
| 2,944,017 | 7/1960 | Cotton | 210—507 X |
| 3,072,497 | 1/1963 | Guglielmo, Sr. | 117—113 X |
| 3,275,489 | 9/1966 | Talv | 156—181 |
| 3,276,598 | 10/1966 | Michaels | 210—500 |
| 3,373,073 | 3/1968 | Turcksim | 156—181 |
| 3,432,585 | 3/1969 | Watson et al. | 210—500 X |
| 3,445,321 | 5/1969 | Groves | 161—92 |

CARL D. QUARFORTH, Primary Examiner

R. GAITHER, Assistant Examiner

U.S. Cl. X.R.

117—113; 156—178; 210—507, 508, 500, 321; 161—98